Nov. 25, 1969          E. GRONDIN            3,480,063
                         TIRE CHAINS
                      Filed Oct. 12, 1967
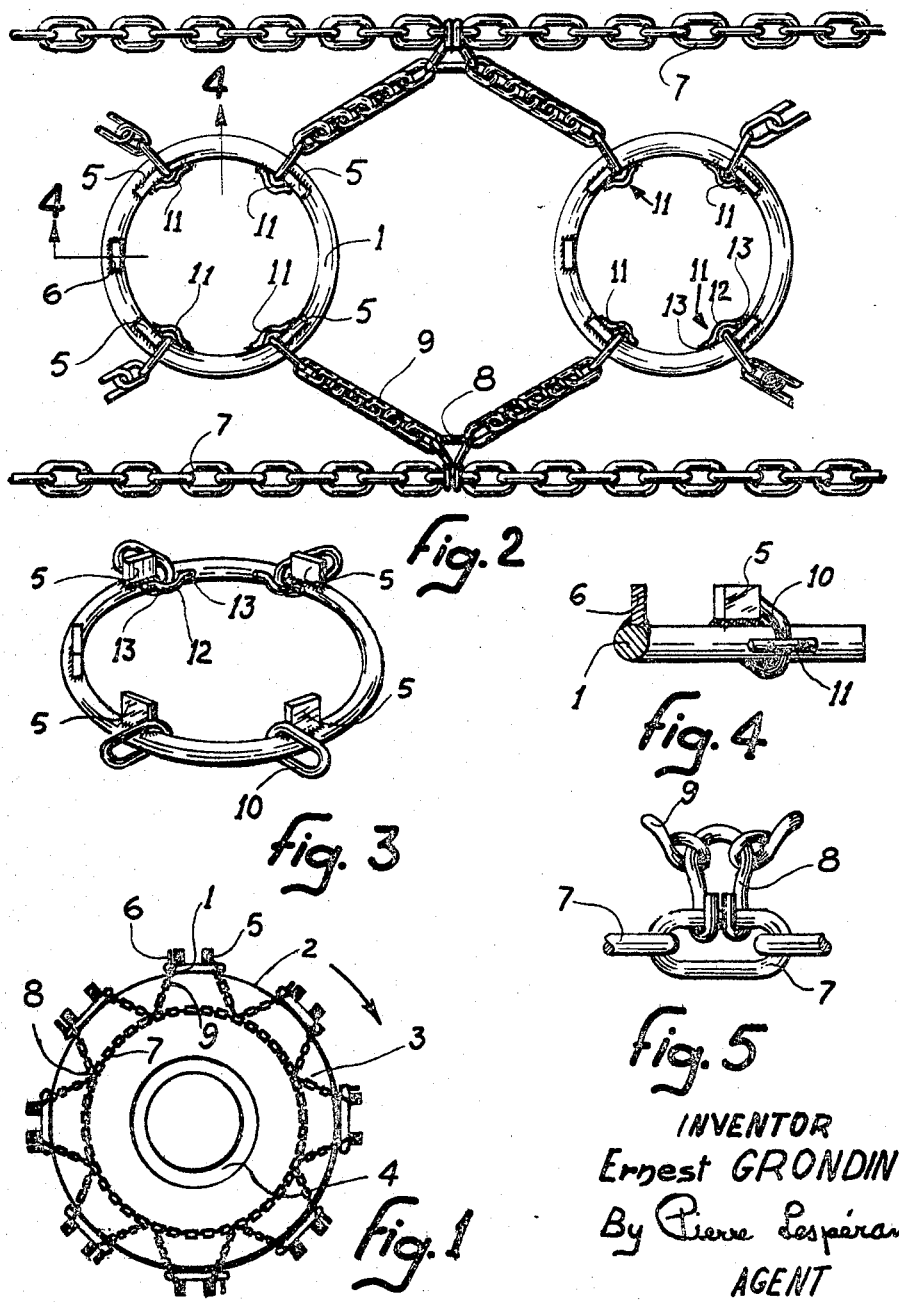
INVENTOR
Ernest GRONDIN
By Pierre Lespérance
        AGENT United States Patent Office 3,480,063
Patented Nov. 25, 1969

3,480,063
TIRE CHAINS
Ernest Grondin, Drummondville, Quebec, Canada, assignor to Drummond Automotive Inc., Drummondville, Quebec, Canada
Filed Oct. 12, 1967, Ser. No. 674,811
Int. Cl. B60c 27/06, 27/00, 27/20
U.S. Cl. 152—230                                    4 Claims

ABSTRACT OF THE DISCLOSURE

This invention concerns a tire chain comprising cleat carrying ring members held against the tread of a tire by chains, the terminal links freely surrounding the ring members, and locating elements secured to the inside of the ring members and freely surrounding the terminal links.

---

The present invention relates to traction devices for vehicle wheels and, in particular, to tire chains for farm tractors and other motor vehicles having relatively large size driving tire wheels.

It is known to provide tire chains of the character described, comprising a plurality of traction elements spacedly maintained on the tread of the tire by a chain arrangement, these traction elements consisting of ring-like metal members provided with upstanding ice-engaging cleats.

In normal tire chains of this type, the chain arrangement is attached to the outside of the ring-like elements by means of perforated ears or half-sized chain links welded to, or integral with, the outside of said ring-like elements. However, it has been found that during use, these ears break or become detached from the ring-like element, because they are exposed to rocks and other obstructions on the ground engaged by the traction elements.

It is, therefore, the general object of the present invention to provide a tire chain of the character described, which is an improvement of the above-mentioned tire chain construction in that the chain arrangement includes terminal links which completely surround the ring-like elements to effect a secure attachment thereto, and that, in addition, ear-like members are welded, or otherwise firmly secured, to the inside of the ring-like elements and surround the terminal chain link to positively prevent displacement of the terminal chain link along the ring-like element and yet enable said terminal chain link to rotate and pivot in all directions with respect to the ring-like elements, thereby resulting in a very secure attachment of the ring-like elements to the chain arrangement, said attachment being free of breakage and yet being very flexible to conform to the tire and to obey under stresses and impact.

Another object of the present invention resides in the provision of a tire chain of the character described, which is of relatively simple and durable construction.

The foregoing and other objects of the present invention will become more apparent during the following disclosure and by referring to the drawings, in which:

FIGURE 1 is a side elevation of a tire wheel provided with the tire chains in accordance with the invention;

FIGURE 2 is a partial top plan view of the tire chain in accordance with the invention laid on a flat plane;

FIGURE 3 is a perspective view of one traction element with terminal chain links attached thereto;

FIGURE 4 is a partial section taken along line 4—4 of FIGURE 2; and

FIGURE 5 is a partial elevation of a detail of the chain arrangement.

Referring now more particularly to the drawings in which like reference characters indicate like elements throughout, the tire chain in accordance with the present invention comprises a plurality of traction elements, generally indicated at 1. Each traction element 1 is preferably in the form of a round ring made of strong material, such as steel, from round stock. The ring 1 may have, for instance, 11″ outside diameter.

The traction elements 1 are adapted to be laid flat on the tread 2 of a pneumatic tire 3 of a driving wheel 4 of a farm tractor or the like motor vehicle.

Cleats 5 and 6 are rigidly welded, or otherwise secured, in spaced positions on ring 1. Each cleat is formed of a thick steel plate, having generally a rectangular shape, about ¼″ or 5/16″ thickness, 1½ to 2″ in length and about 1″ in width. The cleats 5, 6 are longitudinally secured on the traction element 1 such that their width will extend outwardly. Preferably, there are four cleats 5 disposed in pairs adapted to face the two sides of the tire 3, the distance between the cleats in each pair being equal but smaller than the distance between adjacent cleats of the two pairs.

A fifth cleat 6 is disposed mid-way between the adjacent cleats of the two pairs on one side of the ring 1 only. The fifth cleat is arranged to be disposed along the center line of the tread 2 of the tire 3.

The traction elements 1 are preferably disposed on the tire so that the fifth cleat 6 will be trailing with respect to the direction of rotation of the wheel 4 so as to be the last cleat to become out of engagement with the ground or other supporting surface.

The traction elements 1 are maintained flat on the tread surface of the wheel tire 3 by means of the usual concentric lengths of chains 7, one on each side of the tire 3, and provided with a buckle arrangement, not shown, to tie the two ends of the chain lengths 7 together to form a loop.

At substantially equally spaced positions along each chain loop 7, there is attached to one link of the chain 7 a hook link 8, of conventional construction, and to which are in turn attached two diagonal short chain lengths 9, preferably made of twisted chain links and each attached at its other end to one traction element 1 by means of a terminal link 10.

The terminal link 10 is of elongated shape, similar to the links of the chain loop 7 but of bigger size, and completely surrounds the round bar forming the ring-like traction element 1. Thus, the terminal link 10 is free to rotate about the traction element 1 and would be free to slide along said traction element 1 between two adjacent cleats 5, were it not for the locating elements 11.

These elements 11 are preferably made of round steel stock and simply consist of a half-round or curved portion 12 intermediate two straight end portions 13. The end portions 13 are substantially aligned and welded flat against the inside of the traction element 1 with one end portion overlapping the cleat 5. Elements 11 extend in the plane of traction element 1. Thus, the locating elements 11 define with the traction member 1 an eyelet through which the terminal link 10 freely extends, but the latter is prevented from longitudinal movement along the traction element 1 and is positively maintained adjacent a cleat 5. There are four chain lengths 9 radiating from one traction element 1 and the chain lengths 9 are connected two by two by the hook links 8. The latter are disposed opposite each other on the two concentric chain lengths 7.

With the arrangement in accordance with the invention, the chain lengths 9 are free to conform exactly to the outside curved shape of the tire 3, so as to be laid flat thereon and to maintain the traction element 1 on the tread 2 of the tire 3 and yet the terminal lengths 10 are positively prevented from sliding on the traction element 1 and causing wear between the chain terminal length 10 and the traction element 1.

Because the chain terminal links 10 completely surround the bar forming the traction element 1, there is no danger of detachment of the chain lengths 9 from the traction elements 1 when the elements 1 strike a rock or the like obstruction. The cleats 5 and 6 form efficient means to prevent slipping on ice and other slippery surfaces.

What I claim is:

1. In a tire chain, traction elements comprising flat ring members made of round steel stock and cleats protruding therefrom and secured thereto, and a chain system for maintaining said traction members flat against the tread surface of a tire, said chain system including terminal chain links completely surrounding said ring members and rotatable thereon and locating elements secured to the ring members on the inside surface thereof, extending in the plane of the ring members, conforming with and freely surrounding said terminal links to prevent longitudinal movement of said terminal links along said ring members, the inside surface of said ring members being free of any elements connected thereto, except said locating elements.

2. In a tire chain as claimed in claim 1, wherein said locating elements include a central curved portion and two substantially aligned straight end portions, the latter being welded to the inside of the traction element.

3. In a tire chain as claimed in claim 2, wherein said cleats are made of flat rectangular steel blocks welded to said ring-like members and upstanding therefrom and said locating elements are each disposed adjacent a cleat.

4. In a tire chain as claimed in claim 1, wherein said cleats are made of flat rectangular steel blocks welded to said ring-like members and upstanding therefrom and said locating elements are each disposed adjacent a cleat.

References Cited

UNITED STATES PATENTS 3,313,335  4/1967  Gower _____ 152—229

FOREIGN PATENTS 644,509  9/1962  Italy.
663,783  5/1963  Canada.

ARTHUR L. LA POINT, Primary Examiner